US008924015B2

(12) United States Patent
Hammam et al.

(10) Patent No.: US 8,924,015 B2
(45) Date of Patent: Dec. 30, 2014

(54) WHOLE-BODY HUMANOID CONTROL FROM UPPER-BODY TASK SPECIFICATIONS

(75) Inventors: Ghassan Bin Hammam, Columbus, OH (US); David E. Orin, Columbus, OH (US); Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 880 days.

(21) Appl. No.: 12/881,129

(22) Filed: Sep. 13, 2010

(65) Prior Publication Data

US 2011/0066283 A1  Mar. 17, 2011

Related U.S. Application Data

(60) Provisional application No. 61/242,272, filed on Sep. 14, 2009.

(51) Int. Cl.
  *G05B 19/04* (2006.01)
  *B62D 57/032* (2006.01)
  *G05B 19/18* (2006.01)

(52) U.S. Cl.
  CPC .................................. *B62D 57/032* (2013.01)
  USPC ............................ 700/250; 700/245; 700/248

(58) Field of Classification Search
  USPC ............ 180/8.1; 318/568.11, 568.12, 568.15, 318/568.16, 568.17; 700/245, 246, 247, 700/248, 249, 250, 251, 252, 253, 254, 258, 700/259, 260, 261; 901/1, 15, 2, 33, 46, 47, 901/48, 9
  See application file for complete search history.

(56) References Cited

U.S. PATENT DOCUMENTS

| | | | |
|---|---|---|---|
| 5,357,433 A * | 10/1994 | Takenaka et al. | 701/23 |
| 6,289,265 B1 * | 9/2001 | Takenaka et al. | 700/245 |
| 7,145,305 B2 * | 12/2006 | Takenaka et al. | 318/568.12 |
| 2003/0229419 A1 * | 12/2003 | Ishida et al. | 700/245 |
| 2005/0126833 A1 * | 6/2005 | Takenaka et al. | 180/8.1 |
| 2005/0234593 A1 * | 10/2005 | Goswami et al. | 700/245 |
| 2007/0016329 A1 * | 1/2007 | Herr et al. | 700/250 |
| 2009/0252423 A1 | 10/2009 | Zhu et al. | |

OTHER PUBLICATIONS

Caccavel, F. et al., "Resolved-acceleration Control of Robot Manipulators: A Critical Review with Experiments," *Robotica*, 1998, pp. 565-573, vol. 16, No. 5.
Carnegie Mellon University, "CMU Graphics Lab Motion Capture Database," Internet page, jump up to grab, reach for, tiptoe motion, two pages. [Online] [Retrieved Jun. 1, 2011] Retrieved from the Internet <URL:http:mocap.cs.cmu.edu.>.

(Continued)

*Primary Examiner* — Ian Jen
(74) *Attorney, Agent, or Firm* — Fenwick & West LLP; Mark E. Duell

(57) ABSTRACT

A system, method, and computer program product for generating dynamically feasible whole-body motion of a humanoid robot while realizing specified upper-body task motion are described. A kinematically feasible upper-body motion is generated based on the specified upper-body motion. A series of zero-moment points (ZMP) are computed for the generated motion and used to determine whether such motion is dynamically feasible. If the motion is not dynamically feasible, then the torso acceleration is modified to make the motion dynamically feasible, and otherwise synchronized as needed. A series of modified ZMP is determined based on the modified torso acceleration and used to distribute the resultant net ground reaction force and moment to the two feet.

16 Claims, 7 Drawing Sheets

(56) References Cited

OTHER PUBLICATIONS

Luh, J. et al., "Resolved-acceleration Control of Mechanical Manipulators," *IEEE Transactions on Automatic Control*, 1980, pp. 468-474, vol. AC-25, No. 3.

Naksuk, N. et al., "Whole-body Human-to-Humanoid Motion Transfer," *Proceedings of the 5th IEEE-RAS International Conference on Humanoid Robots*, 2005, pp. 104-109.

Ott, C. et al, "Motion Capture based Human Motion Recognition and Imitation by Direct Marker Control," *IEEE-RAS International Conference on Humanoid Robots*, Dec. 1-8, 2008, pp. 399-405.

Sonneborn, L. et al., "The Bang-bang Principle for Linear Control Systems," *Journal of the Society for Industrial and Applied Mathematics, Series A, on Control*, 1964, pp. 151-159, vol. 2, No. 2.

Vukobratovic, M. et al., "Zero-Moment Point—Thirty Five Years of Its Life," *International Journal of Humanoid Robotics*, 2004, pp. 157-173, vol. 1, No. 1.

Waldron, K., "Force and Motion Management in Legged Locomotion," IEEE Journal of Robotics and Automation, Dec. 1986, pp. 214-220, vol. RA-2, No. 4.

Yamane, K. et al., "Dynamics Filter—Concept and Implementation of Online Motion Generator for Human Figures," *IEEE Transactions on Robotics and Automation*, Jun. 2003, pp. 421-432, vol. 19, No. 3.

\* cited by examiner

US 8,924,015 B2

WHOLE-BODY HUMANOID CONTROL FROM UPPER-BODY TASK SPECIFICATIONS

RELATED APPLICATIONS

This application claims the benefit of U.S. Provisional Application No. 61/242,272, filed Sep. 14, 2009, the content of which is incorporated by reference herein in its entirety.

BACKGROUND

1. Field of Disclosure

The disclosure generally relates to the field of controlling motion of a system, and more specifically to generating dynamically feasible motion of a system.

2. Description of the Related Art

The emergence of the field of humanoid robotics in the last decade is largely attributed to the expectation that humanoid robots will eventually become an integral part of our everyday lives, serving as caretakers for the elderly and disabled, providing assistance in homes and offices, and assisting in surgery and physical therapy. From a control perspective, much effort has been aimed at addressing various aspects of humanoid robot control, such as motion execution, safety, constraint handling, multi-contact control, balance control, and obstacle avoidance. See C. Kemp et al., "Springer Handbook of Robotics" (Chapter 56: Humanoids) (2008), B. Siciliano and O. Khatib, Eds., the content of which is incorporated by reference herein in its entirety. Although the utility of robots operating in human environments rests, to a large extent, on execution of upper-body motion and manipulation tasks, the ability to sustain dynamic balance in response to upper-body motion is an important problem that is unique to humanoid robotics research.

Whole-body motion from upper-body task specifications has been examined by several research groups and significant advances have been reported. Given that the hardware platform of many humanoid robots is designed for position control, the majority of past and present developments in whole-body motion control have been centered around kinematic and inverse kinematic control techniques. For example, one approach considered the problem of off-line motion editing when transferring pre-recorded motion from a human to a humanoid robot under the assumption of a single support stance. See N. Naksuk et al., "Whole-body human-to-humanoid motion transfer", *IEEE/RAS International Conference on Humanoid Robots* (2005), pp. 104-109, the content of which is incorporated by reference herein in its entirety. The proposed scheme yielded a balanced humanoid motion with minimal angular momentum at the center of mass. Another approach generates whole-body motion from upper-body human motion capture using a marker system. See C. Ott et al., "Motion capture based human motion recognition and imitation by direct marker control," *IEEE/RAS International Conference on Humanoid Robots* (2008), pp. 399-405, the content of which is incorporated by reference herein in its entirety. However, these approaches do not handle highly dynamic motion since they use a constant center of mass/gravity position centered inside the support polygon in their balance controllers.

Another approach utilizes a full-body dynamic filter developed to convert a physically infeasible reference motion into a feasible one. See K. Yamane et al., "Dynamics filter—concept and implementation of online motion generator for human figures," IEEE Transactions on Robotics and Automation, vol. 19, no. 3, pp. 421-432, (June 2003), the content of which is incorporated by reference herein in its entirety. However, this approach alters all input motion, including the specified upper-body motion, and is not applicable where upper-body task specifications must be preserved. Furthermore, this approach requires careful parameter tuning (feedback gains and weights for pseudo-inverses) for each behavior.

Hence, there is lacking, inter alia, a system and method for generating dynamically feasible whole-body motion of a humanoid robot while realizing specified upper-body motion.

SUMMARY

One aspect of the present invention provides a method (and corresponding system and computer program product) for generating dynamically feasible whole-body motion of a humanoid robot while realizing specified upper-body task motion. The method generates kinematically feasible upper-body motion based on the specified upper-body motion, computes a series of zero-moment points (ZMP) for the generated motion, and determines whether such motion is dynamically feasible. If the motion is not dynamically feasible, then the method modifies the torso acceleration to make the motion dynamically feasible, and otherwise synchronizes the torso acceleration as needed. The method then computes a series of modified ZMP based on the modified torso acceleration and distributes the resultant net ground reaction force and moment to the two feet.

Another aspect of the present invention provides a method (and corresponding system and computer program product) for determining a ZMP for a system. The method determines a joint motion for the system along with a first derivative and a second derivative of the joint motion, and applies a Recursive Newton-Euler algorithm to determining a torque for the system based on the joint motion, the first derivative, and the second derivative. The method determines a resultant ground reaction force for the system based on the determined torque, and computes the ZMP for the system based on the resultant ground reaction force.

Another aspect of the present invention provides a method (and corresponding system and computer program product) for modifying a motion of a system having a plurality of links connected through a plurality of joints. The method modifies a ZMP of the system performing the motion, and determines a modified net force and moment for the system based on the modified ZMP. The method determines a bias force for one of the plurality of links based on the modified net force and moment, determines a bias acceleration for said link based on the determined bias force, and determines a modified motion of the system based on the determined bias acceleration.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The present invention provides a system (and corresponding method and computer program product) for generating dynamically feasible (e.g., balanced) whole-body motion of a humanoid robot (or a human model) while realizing specified upper-body task motion (also called the "reference motion"). The system computes a zero moment point (ZMP) of the humanoid robot based on the upper-body task specifications, and determines whether the reference motion is dynamically feasible based on whether the computed ZMP falls within the support. If the reference motion is not dynamically feasible, the system determines a feasible modification of a commanded torso acceleration to produce a modified ZMP which is inside the support, and distributes a resultant ground reaction force between the two feet of the humanoid robot by minimizing the ankle roll and pitch torques. Once the computed ZMP for the reference motion again falls within the support, the system synchronizes the feasible modified motion to the reference motion.

The Figures (FIGS.) and the following description relate to embodiments of the present invention by way of illustration only. Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Figure 1:
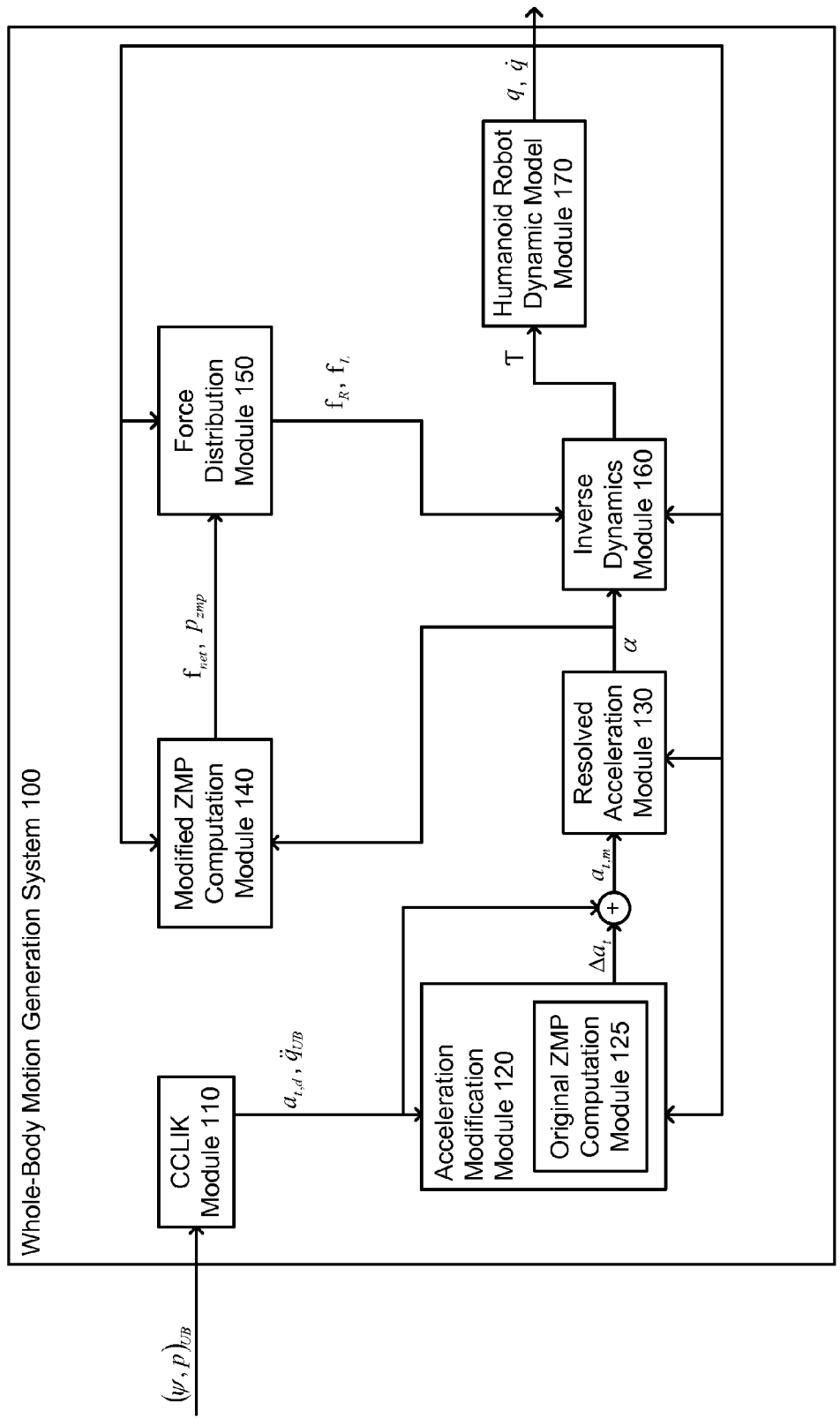
FIG. 1 is a block diagram illustrating a whole-body motion generation system in accordance with one embodiment of the invention.

FIG. 1 is a block diagram illustrating a whole-body motion generation system 100 for generating dynamically feasible (e.g., balanced) whole-body motion of a humanoid robot (or human model) while realizing specified upper-body task motion according to one embodiment. In the following description it is assumed that a humanoid robot is in double support stance and commanded to execute an upper-body motion expressed by Cartesian (or task) variables. As shown, the whole-body motion generation system 100 includes a constrained closed loop inverse kinematics (CCLIK) module 110, an acceleration modification module 120, an original ZMP computation module 125, a resolved acceleration module 130, a modified ZMP computation module 140, a force distribution module 150, an inverse dynamics (ID) module 160, and a humanoid robot dynamic model module 170.

The inputs of the whole-body motion generation system 100 include Cartesian variables representing the desired upper body orientation and position task descriptors denoted by $(\psi, p)_{UB}$. Additional information regarding how the task descriptors are generated is available at U.S. patent application Ser. No. 12/455,257, the content of which is incorporated by reference herein in its entirety. The CCLIK module 110 applies kinematic inversion of the task motion specified by the task descriptors to joint motion commands subject to kinematic constraints (e.g., joint limit constraints, joint velocity constraints, and self collision constraints) using an online constrained closed loop inverse kinematics (CCLIK) algorithm, and outputs a kinematically feasible (e.g., collision free) upper-body joint acceleration vector, $\ddot{q}_{UB}$, and a desired torso acceleration vector, $a_{t,d}$. The kinematically feasible motion/accelerations are also called desired motion/accelerations. Additional information regarding the CCLIK algorithm is available at C. Ott et al., "Motion capture based human motion recognition and imitation by direct marker control," *Proceedings of the IEEE/RAS International Conference on Humanoid Robots*, (December 2008), pp. 399-405, and U.S. patent application Ser. No. 12/455,257, the content of both are incorporated by reference herein in their entirety.

The original ZMP computation module 125 computes a series of ZMP for the humanoid robot performing the desired motion based on the outputs of the CCLIK module 110. The acceleration modification module 120 filters the dynamic effects of the desired upper-body motion by analyzing the computed ZMP and making adjustments to the torso acceleration as needed. The resolved acceleration module 130 takes the modified torso acceleration $\Delta a_t$ and the desired upper-body accelerations $a_{t,d}$ as inputs, and uses position and velocity feedback to compute a resolved acceleration vector $\alpha$ in terms of joint variables. Once subsequent desired upper-body motion becomes dynamically feasible, the resolved acceleration module 130 synchronizes the modified torso acceleration with the desired torso acceleration (e.g., the modified torso acceleration gradually becomes the desired torso acceleration) during a synchronization period.

Because the humanoid robot is in double support stance, the modified ZMP computation module 140 computes a modified ZMP $p_{zmp}$ and a net ground reaction force and moment $f_{net}$ for the humanoid robot based on the resolved acceleration vector $\alpha$. The force distribution module 150 distributes $f_{net}$ between the two feet, denoted by $f_R$ and $f_L$, respectively. The ID module 160 produces the torque commands, denoted by T, to generate dynamically feasible whole-body motion including the desired upper-body motion. The humanoid robot dynamic model module 170 takes the torque commands to calculate the resultant joint position q and velocity $\dot{q}$, and provides the results to other components of the whole-body motion generation system 100. The tracking control based on acceleration modification is referred to as modified resolved acceleration control (MRAC).

Figure 2:
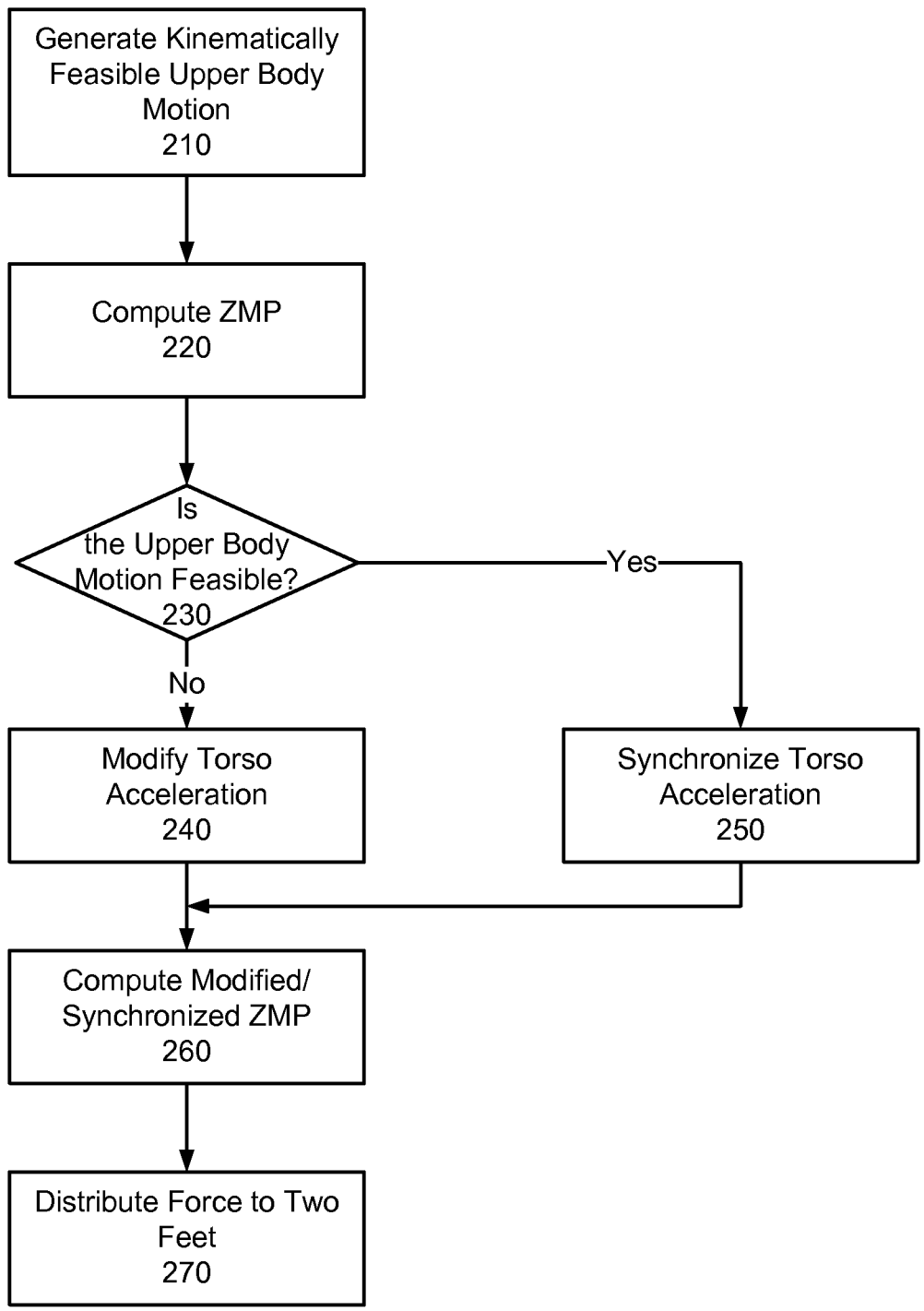
FIG. 2 is a flow diagram illustrating a process of the whole-body motion generation system shown in FIG. 1 in accordance with one embodiment of the invention.

FIG. 2 is a flow diagram illustrating a process 200 for the whole-body motion generation system 100 to generate dynamically feasible whole-body motion while realizing specified upper-body task motion according to one embodiment. Other embodiments can include different and/or additional steps than the ones described herein. As shown, the whole-body motion generation system 100 generates 210 kinematically feasible (e.g., collision free) upper-body motion (also called "desired motion") based on task descriptors representing specified upper-body orientation and position. The whole-body motion generation system 100 computes 220 a series of ZMP based on the kinematically feasible upper-body motion and determines 230 whether such motion is dynamically feasible (e.g., balanced). If the desired upper-body motion is not dynamically feasible, then the whole-body motion generation system 100 modifies 240 the desired torso acceleration to make the motion dynamically feasible, and otherwise synchronizes 250 the torso acceleration with the desired torso acceleration if needed (e.g., previously modified). The whole-body motion generation system 100 then computes 260 a modified ZMP based on the modified torso acceleration and distributes 270 the resultant net ground reaction force and moment to the two feet.

Humanoid Robot Dynamic Model Module

According to one embodiment, the whole-body motion generation system 100 models a humanoid robot (or human model) as a set of N+1 links interconnected by N joints, of up to six degrees of freedom (DOF) each, forming a tree-structure topology. The motion of the links are referenced to a fixed base (inertial frame) which is labeled 0 while the links are labeled from 1 through N. The inertial frame is attached to the ground.

The spatial velocity and acceleration of link i are represented as:

$$v_i = \begin{bmatrix} \omega_i \\ v_i \end{bmatrix}, \quad (1)$$

$$a_i = \begin{bmatrix} \dot{\omega}_i \\ \dot{v}_i \end{bmatrix}, \quad (2)$$

where $\omega_i$, $v_i$, $\dot{\omega}_i$, and $\dot{v}_i$ are the angular velocity, the linear velocity, the angular acceleration, and the linear acceleration of link i, respectively, as referenced to the link coordinate frame.

In order to model a humanoid robot on the fly, one of the links is modeled as a floating base (typically the torso) and numbered as link 1. A fictitious six DOF joint is inserted between the floating base and the fixed base. The total number of DOF in the humanoid is n where $n = \Sigma n_i$, and $n_i$ is the number of DOF for joint i which connects link i to its predecessor. Note that n includes the six DOFs for the floating base.

The spatial force acting on link i from its predecessor is represented as:

$$f_i = \begin{bmatrix} n_i \\ f_i \end{bmatrix}, \quad (3)$$

where $n_i$ is the moment about the origin of the link coordinate frame, and $f_i$ is the translational force referenced to the link coordinate frame.

The spatial coordinate transformation matrix ${}^iX_j$ may be composed from the position vector ${}^jp_i$ from the origin of coordinate frame j to the origin of i, and a 3×3 rotation matrix ${}^iR_j$, which transforms 3D vectors from coordinate frame j to i:

$${}^iX_j = \begin{bmatrix} {}^iR_j & 0_{3\times 3} \\ {}^iR_j S({}^jp_i)^T & {}^iR_j \end{bmatrix}. \quad (4)$$

The quantity S(p) is the skew-symmetric matrix that satisfies $S(p)\omega = p \times \omega$ for any 3D vector $\omega$. This transformation matrix can be used to transform spatial quantities from one frame to another as follows:

$$v_j = {}^jX_i v_i, \quad (5)$$

$$a_j = {}^jX_i a_i, \quad (6)$$

$$f_j = {}^jX_i^{-T} f_i. \quad (7)$$

The equations of motion of a robotic mechanism in joint-space can be written as:

$$\tau = H(q)\ddot{q} + C(q,\dot{q})\dot{q} + \tau_g(q) + J^T f_e, \quad (8)$$

where q, $\dot{q}$, $\ddot{q}$, and $\tau$ denote n-dimensional generalized vectors of joint position, velocity, acceleration and force variables, respectively. H(q) is an (n×n) joint-space inertia matrix. C is an (n×n) matrix such that $C\dot{q}$ is the vector of Coriolis and centrifugal terms. $\tau_g$ is the vector of gravity terms. J is a Jacobian matrix, and $f_e$ is the external spatial force acting on the system. When the feet are the only contacts for the subject with the environment, the external force includes the foot spatial contact forces (ground reaction force/moment), $$f_e = \begin{bmatrix} f_R \\ f_L \end{bmatrix}, \quad (9)$$

where $f_R$ and $f_L$ are the right and left foot spatial contact forces, respectively. Friction and disturbance inputs can easily be added to these equations as well.

In the Inverse Dynamics (ID) problem, given the desired joint accelerations, the joint torques $\tau$ are computed using Equation 8, where the torques can be computed as a function of the joint motion q, its first and second derivatives $\dot{q}$, $\ddot{q}$, and the left and right foot spatial contact forces $f_L$ and $f_R$:

$$\tau = ID(q,\dot{q},\ddot{q},f_R,f_L), \quad (10)$$

and $$\tau = [\tau_{UB}^T f_t^T \tau_R^T \tau_L^T]^T, \quad (11)$$

where $\tau_{UB}$, $\tau_R$, and $\tau_L$ are the joint torques for the upper body, right leg, and left leg, respectively. $f_t$ is the force on the torso (the floating-base link), and it will be zero if the external (foot) forces are consistent with the given system acceleration since the torso is not actuated. In one embodiment, the very efficient O(n) Recursive Newton-Euler Algorithm (RNEA) is applied to calculate the quantities. The RNEA is efficient because it calculates most of the quantities in local link coordinates and it includes the effects of gravity in an efficient manner.

Algorithm for Computing ZMP

Whole-body humanoid robot (or human model) control requires information about the dynamic feasibility of the desired upper-body motion to be performed. Computing the Zero-Moment Point (ZMP) for a given motion can help predicting the dynamic feasibility of the motion, e.g., the balance of the humanoid robot performing the motion. An efficient algorithm for the original ZMP computation module 125 and/or the modified ZMP computation module 140 to compute the ZMP for a given whole-body motion according to one embodiment is described in this section.

The ZMP is defined as the point on the support base at which the resultant reaction forces are acting. See M. Vukobratovic et al., "Contributions to the synthesis of biped gait," *IEEE Transactions on Biomedical Engineering* (1969), vol. 17, no. 1, pp. 25-36, and M. Vukobratovic et al., "Zero-moment point—thirty five years of its life," *International Journal of Humanoid Robotics* (2004), vol. 1, no. 1, pp. 157-173, the content of both are incorporated by reference herein in their entirety. The support base (also called the "support", "support convex", and "base of support") is the region bounded by body parts (e.g., feet) in contact with a support surface or surfaces that exerts a counterforce against the body's applied force (e.g., the ground). Therefore, if the resultant (net) spatial force $f_{net} = [n_{net}^T f_{net}^T]^T$ is known as in FIG. 3*b*, then the ZMP position may be computed as $^0p_{zmp}{}^x = -n_{net}{}^y/f_{net}{}^z$, and $^0p_{zmp}{}^y = n_{net}{}^x/f_{net}{}^z$.

Figure 3:
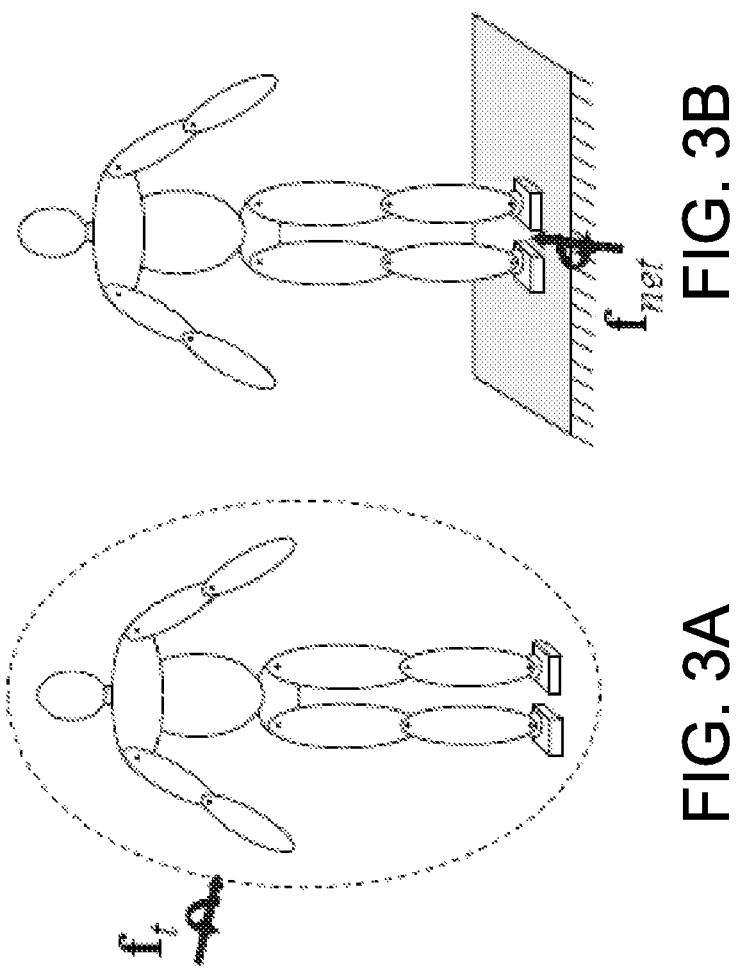
FIGS. 3A and 3B are diagrams illustrating force transformation to compute a zero-moment point (ZMP) in accordance with one embodiment of the invention.

The algorithm for computing the ZMP is based on determining the resultant foot force (force and moment) for a given system acceleration. By solving the inverse dynamics problem using the RNEA for a given system acceleration while applying zero foot forces (free-space inverse dynamics), the resultant spatial force on the system (the torso in the case of RNEA) can be computed as illustrated in FIG. 3*a*. According to Newton's laws of motion, this spatial force can be applied to any body of the system. Therefore, if the spatial force is transformed into the inertial frame (ground), the resultant ground reaction force (resultant foot force) will be obtained (see FIG. 3*b*) and then the ZMP position is computed. The algorithm is summarized in the table below. Note that the resulting algorithm is efficient because the main computation is the RNEA for inverse dynamics for the kinematic trees of the humanoid robot dynamic model.

---
Input: model, q, $\dot{q}$, $\ddot{q}$
Output: $^0p_{zmp}$
Begin
    $\tau = ID(q, \dot{q}, \ddot{q}, 0, 0)$;
    $f_{net} = {}^0X_t{}^{-T} f_t$;
    $^0p_{zmp}{}^z = 0$;
    $^0p_{zmp}{}^x = -n_{net}{}^y / f_{net}{}^z$;
    $^0p_{zmp}{}^y = n_{net}{}^x / f_{net}{}^z$;
End

---

Modified Resolved Acceleration

In order to realize the desired upper-body motion while maintaining balance of the humanoid robot, the whole-body motion generation system 100 applies a resolved acceleration control (RAC) process to filter the dynamic effects of the desired upper-body motion by appropriately modifying and synchronizing the desired torso acceleration. The method allows coordination of the legs to give the desired motion of the torso, and coupled with the force distribution method described below, provides for control of the individual foot forces. The RAC process is described in detail in subsection A below.

The RAC process requires dynamically feasible motion to track. Therefore, a mechanism for motion modification is necessary for the RAC process when the motion is dynamically infeasible (e.g., not balanced). Subsection B describes an example method for the acceleration modification module 120 to modify the system acceleration (e.g., the torso acceleration) so that the motion is feasible. In addition, to track the desired motion of the torso from the upper-body task specifications, the modified motion needs to be quickly and smoothly moved to the desired motion when the desired motion is again dynamically feasible. A method to synchronize the modified motion with the desired motion is described in subsection C below.

A. Resolved Acceleration Control

The output of the RAC process along with the foot forces from the force distribution module 150 are used to compute the lower-body joint torques required to produce the modified motion of the torso using Inverse Dynamics (ID) as illustrated in Equation 10.

Let $\psi_t$ and $p_t$ denote the torso orientation (described by Euler angles) and position, respectively. The task-descriptor vector $x_t = [\psi_t{}^T p_t{}^T]^T$ is related to the spatial velocity of the torso $v_t$ via an equation of the form $$\dot{x}_t = E(x_t) v_t \quad (12)$$

where E is a 6×6 transformation matrix that depends on the Euler sequence used. The resolved acceleration is set by $\alpha = \ddot{q}$ where $$\ddot{q} = [\ddot{q}_{UB}{}^T a_t{}^T \ddot{q}_R{}^T \ddot{q}_L{}^T]^T \quad (13)$$

is the commanded whole-body acceleration (system acceleration) which includes compensation for feedback errors. The torso acceleration $a_t$ is computed as $$a_t = a_{t,m} + K_{v,t}(v_{t,m} - v_t) + K_{p,t} e_t, \quad (14)$$

where $$a_{t,m} = a_{t,d} + \Delta a_t. \quad (15)$$

$v_{t,m}$ and $a_{t,m}$ are the modified torso spatial velocity and acceleration, respectively, and will be discussed in further detail in subsection B below. $v_t$ is the current torso spatial velocity and $a_{t,d}$ is the desired torso spatial acceleration from the original motion. $e_t$ is the position and orientation error computed as:

$$e_t = \begin{bmatrix} 0.5 \left( \sum_{j=1}^{3} c_j \times c_{j,m} \right) \\ {}^0p_{t,m} - {}^0p_t \end{bmatrix}, \quad (16)$$

where $^0p_{t,m}$ and $^0p_t$ are the modified and current torso positions, and $c_j$ and $c_{j,m}$ are jth columns of the current orientation $^0R_t$, and the modified orientation $^0R_{t,m}$ matrices, respectively. $K_{p,t}$ and $K_{v,t}$ are matrices of proportional and derivative gains for torso control.

For a tree-structure the right and left foot velocities $(v_R, v_L)$ can be computed from the following equations:

$$v_R = J_R \dot{q}_R + {}^R X_t v_t, \quad (17)$$

$$v_L = J_L \dot{q}_L + {}^L X_t v_t, \quad (18)$$

where $J_R$, $J_L$, $\dot{q}_R$, $\dot{q}_L$, denote the right and left leg Jacobian matrices, and the right and left leg velocities, respectively. Note that $^R X_t v_t$ represents the velocity of the torso at a point which instantaneously coincides with the right foot position, and $^L X_t v_t$ represents the velocity of the torso at a point which instantaneously coincides with the left foot position. By taking the derivative of Equations 17 and 18 and then re-ordering the resulting equations, the right and left leg accelerations ($\ddot{q}_R$ and $\ddot{q}_L$) can be computed using the following equations:

$$\ddot{q}_R = J_R{}^\dagger (a_R - {}^R X_t a_t - \dot{J}_R \dot{q}_R), \quad (19)$$

$$\ddot{q}_L = J_L{}^\dagger (a_L - {}^L X_t a_t - \dot{J}_L \dot{q}_L), \quad (20)$$

where $J^\dagger$ denotes the pseudo-inverse of J. For the case when each leg has 6 DOF, as in many humanoids including Honda's humanoid robot ASIMO, the pseudo-inverse $J^\dagger$ can simply be replaced by the inverse $J^{-1}$. For the case of constrained feet (as in single or double support cases), $a_R$ and/or $a_L = 0$. The control law is the same as Equation 8 after replacing $\ddot{q}$ with $\alpha$.

The upper-body accelerations for the arms are set by using computed-torque control specified in the following equation:

$$\ddot{q}_{UB} = \ddot{q}_{UB,d} + K_{v,UB} \dot{e}_{UB} + K_{p,UB} e_{UB} \quad (21)$$

where $$e_{UB} = q_{UB,d} - q_{UB}, \quad (2)$$

$$\dot{e}_{UB} = \dot{q}_{UB,d} - \dot{q}_{UB}. \quad (23)$$

Additional information about computed-torque control is available at W. Chung et al., "Springer Handbook of Robotics" (Chapter 6: Motion control) (2008), B. Siciliano and O. Khatib, Eds., the content of which is incorporated by reference herein in its entirety.

B. Acceleration Modification

The RAC process tracks a dynamically feasible motion. Therefore, when the computed ZMP is outside the support base, the humanoid robot can become dynamically unstable and the RAC process will fail. To prevent this failure from happening, the acceleration modification module 120 applies a method 400 to modify the desired torso acceleration so that the motion is feasible, balanced, and controllable, as illustrated in the flow diagram in FIG. 4. The method 400 filters the dynamic effects of the motion that cause the ZMP to leave the support base through the following steps:

Firstly, the computed ZMP is modified 410 to be brought back inside the area of support. The computed ZMP is projected inside the support area with an appropriate safety margin. The new ZMP is designated as the modified ZMP $^0p_{zmp,m}$.

Secondly, the modified net force $f_{net,m}$ and moment $n_{net,m}^z$ at the modified ZMP are determined 420. The net force at $^0p_{zmp,m}$ is derived from the net force $f_{net}$ so that the modified force has the same normal component as the net force, and the same moment about the torso origin. In particular, $$f_{net,m}^z = f_{net}^z, \quad (24)$$

$$^tp_{zmp,m} \times f_{net,m} + \begin{bmatrix} 0 \\ 0 \\ n_{net,m}^z \end{bmatrix} = {}^tp_{zmp} \times f_{net} + \begin{bmatrix} 0 \\ 0 \\ n_{net}^z \end{bmatrix}. \quad (25)$$

Thirdly, the bias torso force is determined 430. The bias torso force $\Delta f_t$ is the bias force on the torso due to the net force change and is calculated using the following equation:

$$\Delta f_t = {}^tX_0^{-T}(f_{net,m} - f_{net}). \quad (26)$$

Figure 5:
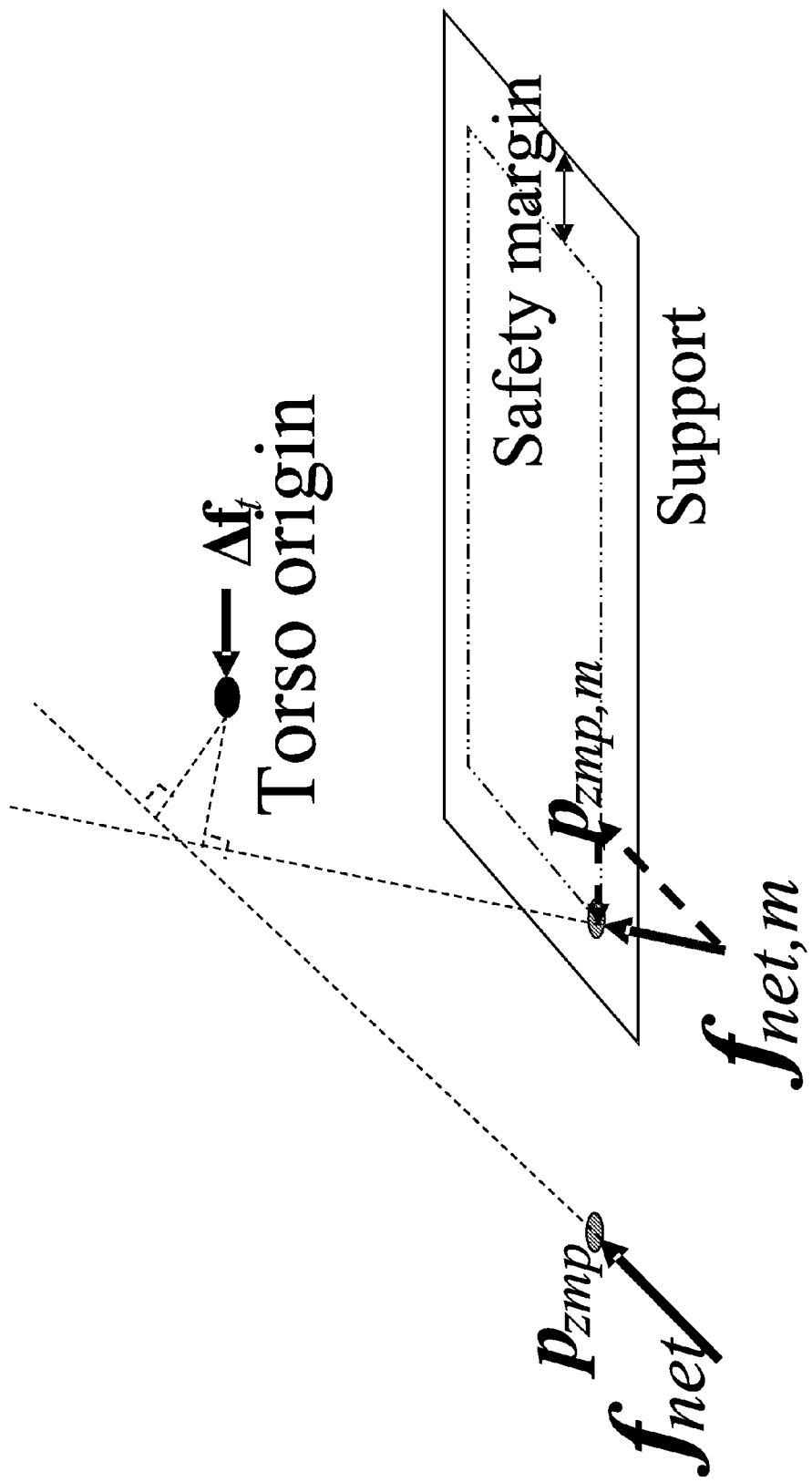
FIG. 5 is a diagram illustrating several steps of the process shown in FIG. 4 in accordance with one embodiment of the invention.

The force is chosen to be applied to the torso since it is the most massive link of the system. As a result, the dynamic effect of the force is significant. FIG. 5 is a diagram that illustrates steps 1-3 according to one embodiment.

Fourthly, the bias torso acceleration (change in acceleration) is determined 440. The acceleration change caused by $\Delta f_t$ may be computed with the dynamic equation for the torso using the following equation:

$$\Delta f_t = I(q)\Delta a_t, \quad (27)$$

where $I(q)$ is the operational-space inertia matrix as seen at the torso which is approximated here by the articulated-body inertia for the tree-structure system at the torso. The torso acceleration is modified by $\Delta a_t$.

Fifthly, the new modified motion is determined 450 based on the change of torso acceleration as follows:

$$\ddot{x}_{t,m}(t) = \ddot{x}_{t,d}(t) + \Delta \ddot{x}_t(t), \quad (28)$$

where $$\ddot{x}(t) = \dot{E}(x)v_t(t) + E(x)\Delta a_t(t). \quad (29)$$

Note that whenever the computed ZMP for the motion is outside the support area, the humanoid robot does not track the desired motion, and instead tracks the modified motion that brings the ZMP back to inside the support.

C. Synchronization of Modified Trajectory

Once the computed ZMP is inside the support area after the motion has been modified, the whole-body motion generation system 100 resumes tracking the desired motion (both position and velocity), thus allowing the humanoid robot to continue tracking the desired motion. However, when the computed ZMP reenters the support area, the modified and the desired original motion states may be significantly different. Therefore, trying to track the desired motion immediately might cause instability due to the large acceleration injected into the system. Even worse, the large feedback error (see e.g., Equation 14) might cause the computed ZMP to be outside the support area, thereby causing the humanoid robot to be unbalanced.

In one embodiment, the resolved acceleration module 130 synchronizes the modified motion using a bang-bang solution which results in the minimum acceleration required over a brief synchronization period. Additional information about the bang-bang solution is available at L. M. Sonneborn et al., "The bang-bang principle for linear control systems" (Series A, On control, 1964), *Journal of the Society for Industrial and Applied Mathematics*, vol. 2, no. 2, pp. 151-159, the content of which is incorporated by reference herein in its entirety. The synchronization period is chosen so that the synchronization acceleration $\ddot{x}_s$ does not introduce additional significant dynamic effects that might cause the ZMP to go outside the support area. The original motion is modified as follows:

$$\ddot{x}_{t,m}(t) = \ddot{x}_{t,d}(t) \pm \ddot{x}_s. \quad (30)$$

The switching point for this bang-bang solution ($t_{sw}$) is found from $t_{sw} = t$ when $$\Delta \dot{x}^j(t) = -\text{sgn}(\Delta \dot{x}^j(t))\sqrt{2|\ddot{x}_s^j||\Delta x^j(t)|},$$

where $x^j(t)$ is the jth component of x at time t.

Force Distribution

When the feet are in double support, in order to compute the joint torques that are required to track the commanded motion, the right and left foot spatial contact forces ($f_R$ and $f_L$) need to be computed (see e.g., Equation 10), in addition to the desired joint accelerations ($\alpha$). The ZMP algorithm described above computes the net force $f_{net}$ but not the individual foot forces (or ZMPs). Therefore, this force should be distributed between the two feet to set the individual foot forces. This is an under-specified problem. Therefore, in one embodiment extra constraints are introduced to solve the problem.

Firstly, in order to minimize the interaction forces between the feet that might cause slippage, it is assumed that the foot forces are parallel to the net force. That is, each foot force is set to a percentage $\eta$ of the net force. This percentage is based on the distance from the foot ZMP (local ZMP) to the computed ZMP:

$$^0f_{zmp,k} = \eta_k f_{net}, \quad (31)$$

$$^0n_{zmp,k}^z = \eta_k n_{net}^z, \text{ for } k \in \{R, L\} \quad (32)$$

$$\eta_R = \left(\frac{d_L}{d_R + d_L}\right) \quad (33)$$

and $$\eta_L = \left(\frac{d_R}{d_R + d_L}\right) = 1 - \eta_R, \quad (34)$$

where $$d_k = \|{}^0p_{zmp,k} - {}^0p_{zmp}\|. \quad (35)$$

Note that $n_{net}^x$ and $n_{net}^y$ are zero at the ZMP. This force, as represented in the ankle's frame, is computed as:

$$^{A,k}f_{zmp,k} = {}^{A,k}R_0\,{}^0f_{zmp,k}, \quad (36)$$

where (A, k) is a coordinate system that is aligned with ankle k's joint axes and its origin is at the ankle joint origin. This local force has the following moment about the ankle's center:

$$n_{A,k} = {}^{A,k}p_{zmp,k} \times {}^{A,k}f_{zmp,k} + {}^{A,k}R_0\,{}^0n_{zmp,k}, \quad (37)$$

where $^{A,k}p_{zmp,k}$ is the position of the ZMP for foot k as represented in the ankle's frame, and it can be computed as:

$$^{A,k}p_{zmp,k} = {}^{A,k}R_0({}^0p_{zmp,k} - {}^0p_{A,k}). \quad (38)$$

Secondly, the force distribution module 150 searches for a solution that minimizes the roll and pitch ankle torques, to minimize ankle energy. This problem can be formulated as an optimization problem in which minimizing the roll ($n_{A,k}^x$) and pitch ($n_{A,k}^y$) ankle torques is the objective criteria (function). The first constraints are the foot boundaries. Satisfaction of the moment balance equations in the support plane about the line connecting the foot ZMPs, enforces an additional constraint that the foot ZMPs and overall ZMP be on a line, as illustrated in the following equation:

$$({}^0p_{zmp,R} - {}^0p_{zmp}) \times ({}^0p_{zmp,L} - {}^0p_{zmp}) = 0. \quad (39)$$

See K. Waldron, "Force and motion management in legged locomotion," *IEEE Journal of Robotics and Automation* (1986), vol. RA-2, no. 4, pp. 214-220, the content of which is incorporated by reference herein in its entirety.

The above solution can be summarized as:

minimize(norm$[n_{A,R}^x n_{A,R}^y]$+norm$[n_{A,L}^x n_{A,L}^y]$) subject to:

1) $^0p_{zmp,R}$ is within the right foot boundaries,
2) $^0p_{zmp,L}$ is within the left foot boundaries, and
3) $^0p_{zmp,R}$ and $^0p_{zmp,L}$ satisfy the ZMP line constraint.

The above formulation provides a general solution for the force distribution problem. A simple geometric solution for the common case in which the feet are side by side can be computed by eliminating the roll ankle torque only. The solution is based on having each foot force vector intersect with its roll axis. Further, the line that connects the foot ZMPs and the overall ZMP is set parallel to the line between the ankle centers. The resulting equations are:

$$^0p_{zmp,k}^x = {}^0p_{zmp}^x, \quad (39)$$

$$^0p_{zmp,k}^y = \frac{-{}^0p_{A,k}^z f_{net}^y}{f_{net}^z} + {}^0p_{A,k}^y. \quad (39)$$

EXAMPLES

One embodiment of the disclosed whole-body motion generation system 100 is tested using a model of the Honda humanoid robot ASIMO (also called the "ASIMO model"). During the test, the whole-body motion generation system 100 controls the ASIMO model to simulate a highly dynamic upper-body reference motion using RobotBuilder, which is a 3D graphical dynamics simulation package based on the DynaMechs library. See S. McMillan et al., "DynaMechs: an object oriented software package for efficient dynamic simulation of underwater robotic vehicles" in "Underwater Robotic Vehicles Design and Control", *TSI Press* (1995), pp. 73-98, the content of which is incorporated by reference herein in its entirety. An approximately 45-second upper-body "reaching" motion from the CMU motion database is chosen as an input to the proposed control algorithm. This motion is chosen because it is non-periodic, complex, and a somewhat fast motion. For this motion, it is assumed that the feet are always in double support and their positions are chosen to be side by side with a hip-width distance between them.

Figure 6B:
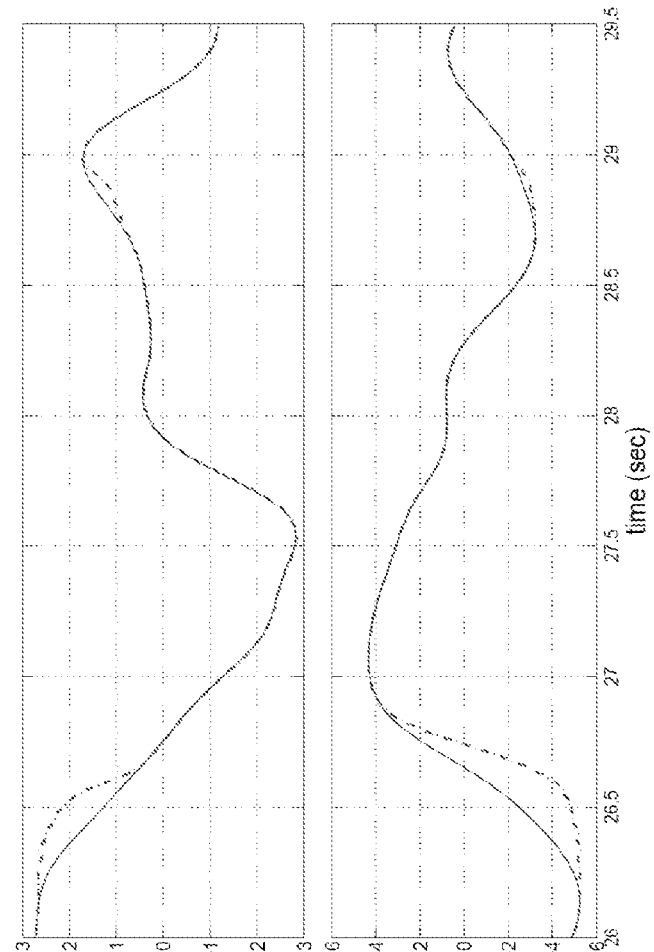
FIGS. 6A-6D are diagrams showing a result of the whole-body motion generation system for generating dynamically feasible whole-body motion of Honda's humanoid robot ASIMO based on a specified upper-body task motion in accordance with one embodiment of the invention.
Figure 6A:
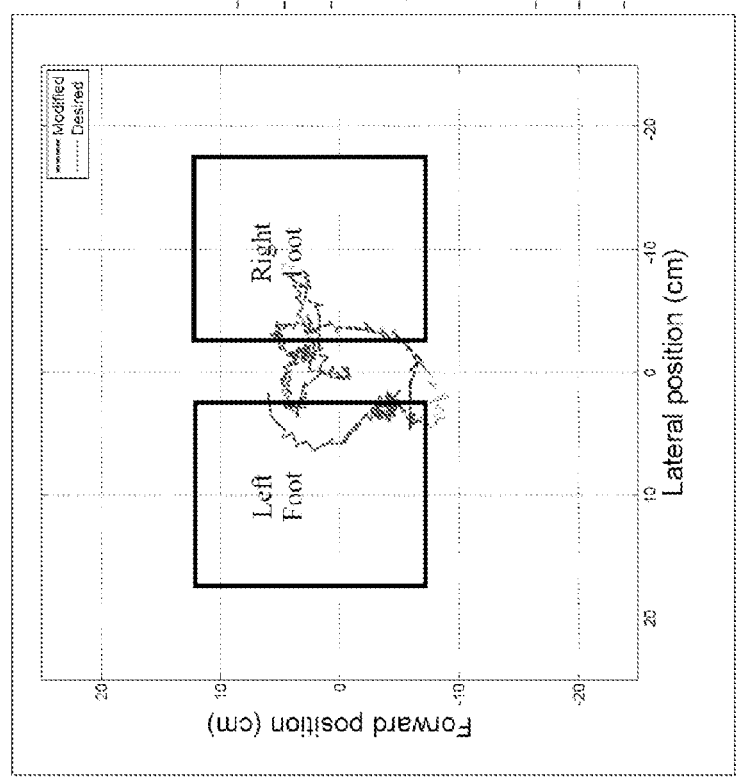
Figure 6D:
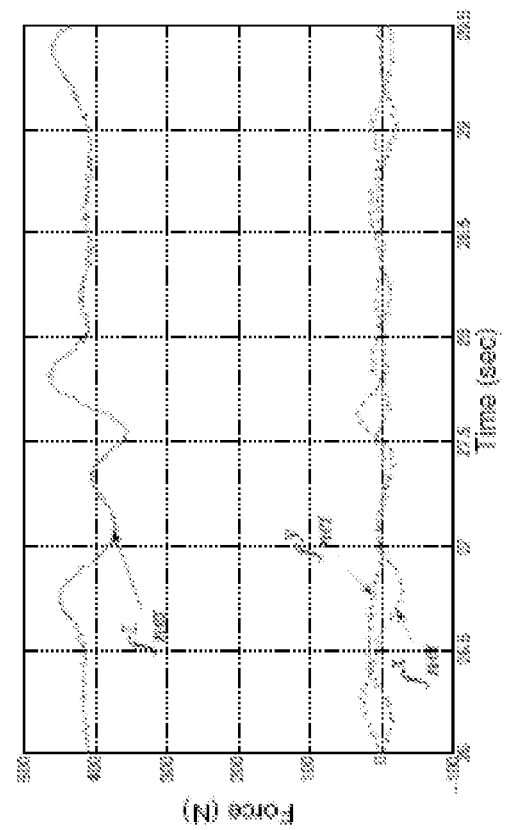
Figure 6C:
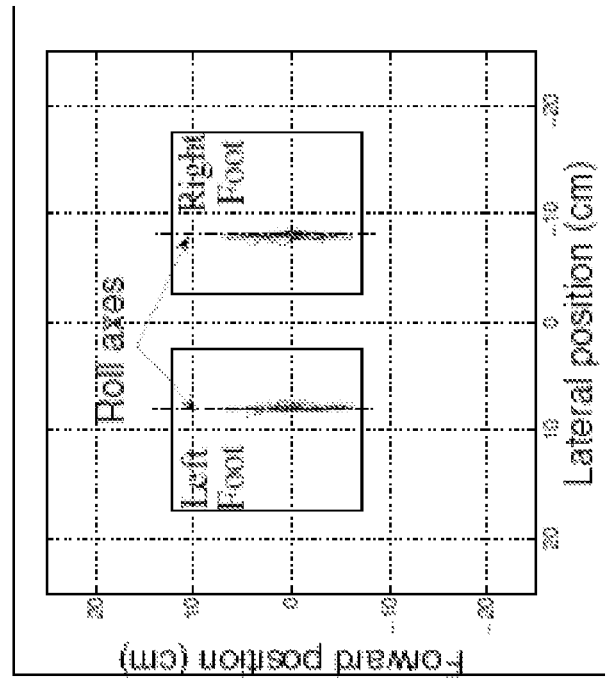

FIG. 6A is a diagram showing the computed ZMP for the entire motion at the original speed (solid line) and the modified ZMP (dotted line). As shown, the computed ZMP is outside the support for certain periods. Thus the motion was dynamically infeasible and the RAC failed to track it. In comparison, the modified ZMP is inside the support for the entire period and overlaps with the computed ZMP when the latter also falls inside the support. Accordingly, using the MRAC, the motion was tractable and balanced. FIG. 6B shows how MRAC modified the torso position, as an example. The motion has been modified just after the 26th second when the computed ZMP was outside the support and the synchronization starts as soon as the computed ZMP returned to the support at t=26.5 sec. It has been observed during the test that similar results were obtained for different (faster and slower) speeds. FIG. 6C illustrates the foot ZMPs for a portion of the motion. As shown, each foot ZMP is located near the roll axis of the ankle. This is because the vertical (normal) component $f_{net}^z$ of the net force $f_{net}$ is the dominant force as shown in FIG. 6D.

SUMMARY

The described embodiments provide a very efficient and effective dynamics filter which is applicable for general upper-body motion when a humanoid robot is standing in place. The dynamics filter is based on efficient inverse dynamics calculations. It involves modification of the motion of the torso so as to constrain the commanded motion to produce a ZMP which is inside the support. The feasible, commanded motion is synchronized to the desired reference motion when the computed ZMP for the reference motion again falls within the support. Resolved Acceleration Control is developed for a humanoid to track the desired/modified motion.

The described embodiments produce a feasible motion that satisfies the foot constraints for highly dynamic upper-body task specifications. It may be extended to handle the situations when the projection of a center of mass (COM) drifts outside the support due to the desired upper-body motion. This can be achieved by adding the COM as a task-descriptor and constraining its projection to be inside the support. If the task is unreachable or cannot be executed, a step can be triggered.

Figure 4:
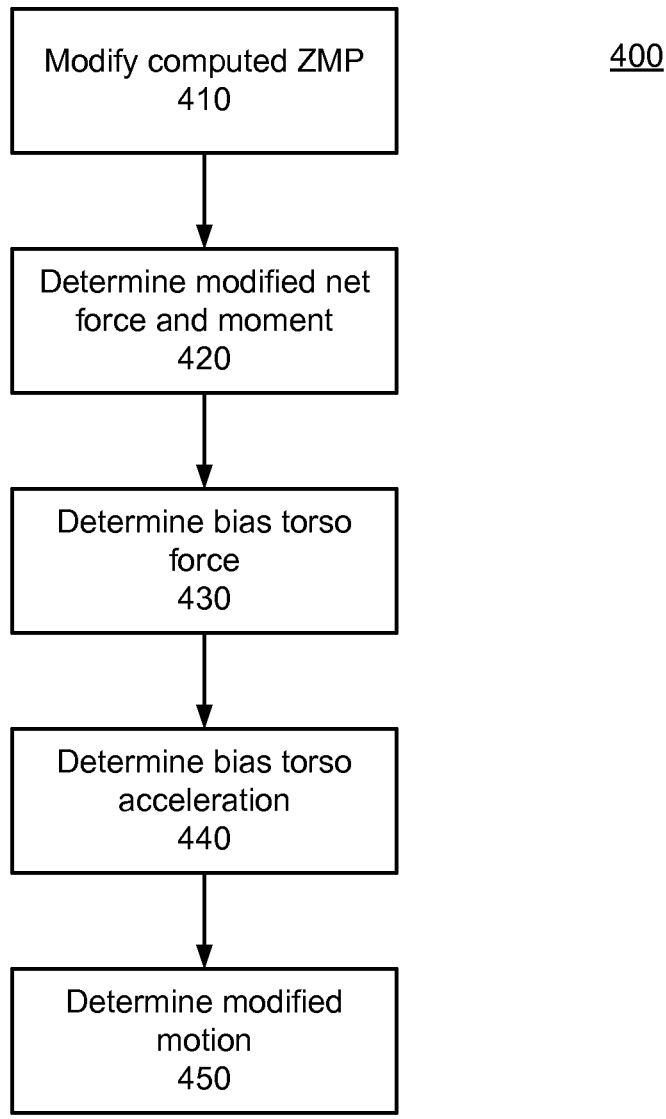
FIG. 4 is a flow diagram illustrating another process of the whole-body motion generation system shown in FIG. 1 in accordance with one embodiment of the invention.

Some portions of above description describe the embodiments in terms of algorithmic processes or operations, for example, the processes and operations as described with FIGS. 1, 2, and 4.

One embodiment of the present invention is described above with reference to the figures where like reference numbers indicate identical or functionally similar elements. Also in the figures, the left most digit of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems. The invention can also be in a computer program product which can be executed on a computing system.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer based method comprising:
   computing a zero-moment point (ZMP), a net force, and a net moment for a whole body motion of a system including performing a specified upper-body task motion;
   determining whether the specified upper-body task motion is dynamically feasible based on the computed ZMP;
   responsive to a determination that the specified upper-body task motion is dynamically infeasible,
      modifying the ZMP to generate a modified ZMP within a support of the system;
      determining a modified net force and a modified net moment based on the modified ZMP, the net force, and the net moment,
         wherein the modified net force has a same normal component as the net force, and
         wherein the modified net moment has a same moment about a torso origin of the system as the net moment;
      determining a bias torso acceleration based on the modified net force;
      determining a modified whole body motion based on the bias torso acceleration; and
   performing the modified whole body motion to perform the specified upper-body task motion.

2. The method of claim 1, wherein determining whether the specified upper-body task motion is dynamically feasible comprises:
   determining that the ZMP is outside a support base of the system; and
   responsive to a determination that at least one of the computed ZMP is outside the support base, determining that the ZMP is outside the support base, determining that the specified upper-body task motion is dynamically infeasible.

3. The method of claim 1, wherein the system comprises a humanoid robot or a human model, and the body segment comprises a torso.

4. The method of claim 1, further comprising:
   distributing a resultant force to two feet of the system.

5. The method of claim 4, wherein distributing the resultant force to the two feet of the system comprises:
   distributing the resultant force to the two feet such that roll and pitch ankle torques of the system are minimized.

6. The method of claim 1, further comprising:
   synchronizing the modified motion with the specified upper-body task motion within a synchronization period.

7. The method of claim 6, wherein the synchronization period is determined such that the synchronizing step does not introduce additional significant dynamic effects causing the resulting motion to be dynamically infeasible.

8. The method of claim 6, wherein synchronizing the modified motion comprises:
   synchronizing the modified motion using a bang-bang solution which results in a minimum acceleration required over a synchronization period.

9. A computer based method, the method comprising:
   computing a zero-moment point (ZMP), a net force, and a net moment for an original whole body motion of the system including performing a specified upper-body task motion;
   modifying the ZMP of the original whole body motion to generate a modified ZMP within a support of the system;
   determining a modified net force and a modified net moment for the system based on the modified ZMP, the net force, and the net moment,
      wherein the modified net force has a same normal component as the net force, and
      wherein the modified net moment has a same moment about a torso origin of the system as the net moment;
   determining a bias force for a torso of the system based on the modified net force and the modified net moment;
   determining a bias acceleration for the torso based on the determined bias force; and
   determining a modified whole body motion of the system based on the determined bias acceleration, the modified whole body motion capable of performing the specified upper-body task motion.

10. The method of claim 9, wherein the system comprises a human model or a humanoid robot, and said link comprises a torso.

11. The method of claim 9, wherein the original whole body motion is dynamically infeasible and the modified whole body motion is dynamically feasible.

12. The method of claim 9, wherein modifying the ZMP of the original whole body motion comprises modifying the ZMP to be inside a support base for the system.

13. The method of claim 12, wherein the support base comprises a region bounded by one or more links of the system in contact with a support surface that exerts a counterforce.

14. The method of claim 13, wherein the system comprises a human model or a humanoid robot, the one or more links comprises two feet, the support surface comprises the ground, and the counterforce comprises the ground reaction force.

15. The method of claim 13, wherein the modified net force has a same normal component as an original net force and a same moment about said link.

16. The method of claim 9, wherein the system comprises an upper-body connected with a lower-body, the original motion comprises an upper-body motion.

* * * * *

UNITED STATES PATENT AND TRADEMARK OFFICE
CERTIFICATE OF CORRECTION

PATENT NO. : 8,924,015 B2
APPLICATION NO. : 12/881129
DATED : December 30, 2014
INVENTOR(S) : Ghassan Bin Hammam et al.

It is certified that error appears in the above-identified patent and that said Letters Patent is hereby corrected as shown below:

In the Claims:

Claim 2, column 14, lines 46-48, delete "responsive to a determination that at least one of the computed ZMP is outside the support base, determining that the ZMP is outside the support base" and insert --responsive to determining that the ZMP is outside the support base--.

Claim 7, column 14, line 67, delete "resulting motion" and insert --synchronized motion--.

Signed and Sealed this
Nineteenth Day of January, 2016

Michelle K. Lee
*Director of the United States Patent and Trademark Office*